Sept. 23, 1958     F. COREY ET AL     2,852,805
POULTRY DRESSING APPARATUS
Filed Sept. 6, 1955     4 Sheets-Sheet 1
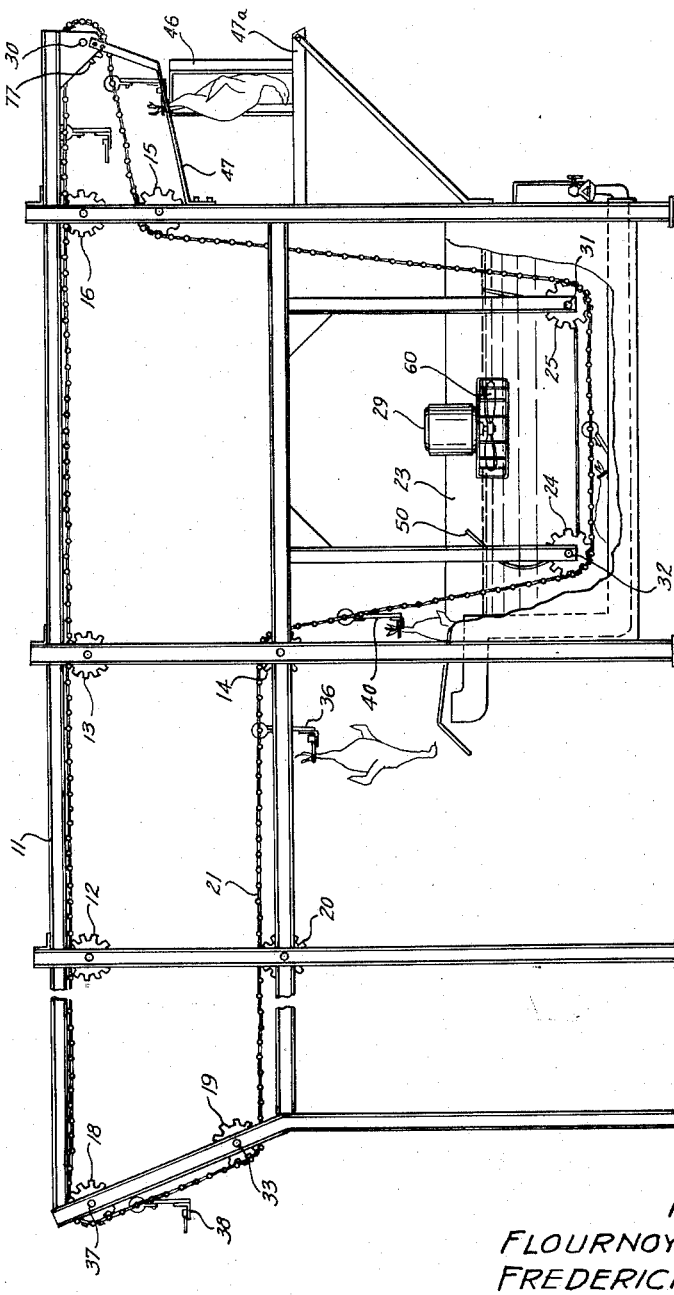
INVENTORS.
FLOURNOY COREY
FREDERICK C. COREY
ROY H. FARCHMIN
BY Flournoy Corey
ATTORNEY.

Sept. 23, 1958  F. COREY ET AL  2,852,805
POULTRY DRESSING APPARATUS
Filed Sept. 6, 1955  4 Sheets-Sheet 2
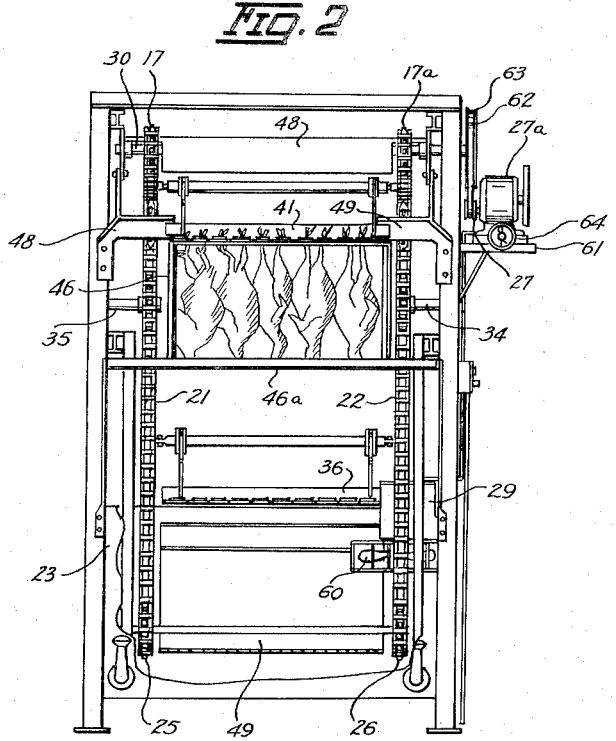
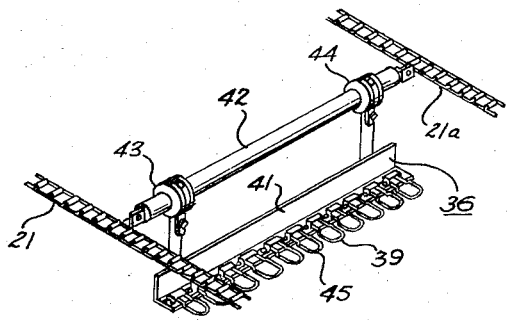
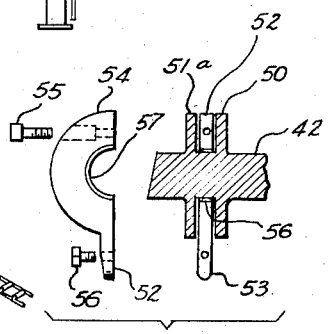
INVENTORS.
FLOURNOY COREY
FREDERICK C. COREY
ROY H. FARCHMIN
BY
Flournoy Corey
ATTORNEY.

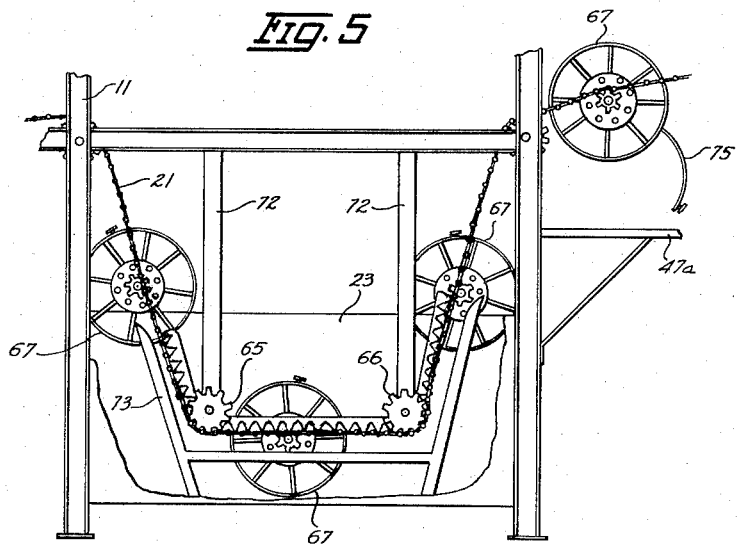
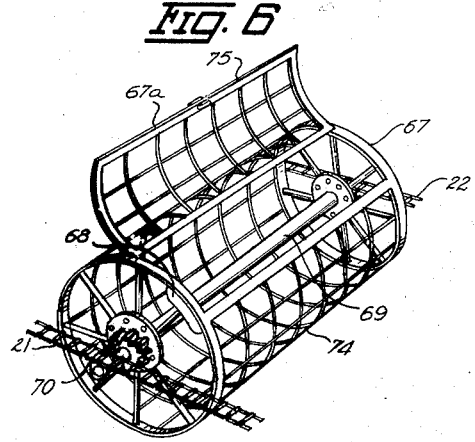
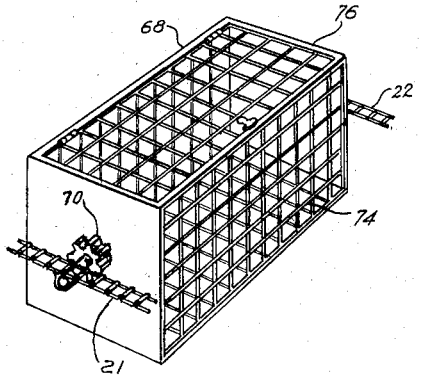
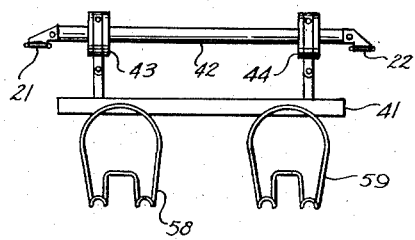

Sept. 23, 1958 F. COREY ET AL 2,852,805
POULTRY DRESSING APPARATUS
Filed Sept. 6, 1955 4 Sheets-Sheet 4

INVENTORS.
FLOURNOY COREY
FREDERICK C. COREY
ROY H. FARCHMIN
BY
Flournoy Corey
ATTORNEY.

United States Patent Office

2,852,805
Patented Sept. 23, 1958

2,852,805

POULTRY DRESSING APPARATUS

Flournoy Corey, Frederick C. Corey, and Roy H. Farchmin, Cedar Rapids, Iowa, assignors to Pickwick Company, Cedar Rapids, Iowa, a corporation of Iowa Application September 6, 1955, Serial No. 532,487

2 Claims. (Cl. 17—11.2)

This invention relates to a device for scalding poultry, and is more particularly directed to a continuous scalding process unit which is capable of scalding birds in groups for the picking operaton.

The poultry processing industry is and has been undergoing rapid advancement in the matter of handling and dressing larger and increasingly larger volumes of poultry in substantially continuous operations. Generally, poultry processing consists of three major steps, that of killing and scalding the fowl, that of removing the feathers from the fowl, and that of eviscerating the bird once the feather removing is completed. In the past, each step has required individual handling of each bird through the progressive operations, no one operation being more time consuming than another, thereby resulting in a continuous flow without particularly high output per man hour.

This situation, however, has undergone considerable change and is still undergoing change in that the actual feather removing operation has been the subject of much research and study, which has resulted in the perfection of machines capable of dressing a number of birds at one time, thus advancing the rapidity of this step in the operation to a relationship of four to five times greater than was formerly achieved.

It is therefore a primary object of our invention to provide a device in which the poultry can be carried through the killing and scalding operation in successive batches of many birds at a time. This process might be termed the lateral expansion or multiple method, rather than the successive method of one by one production hitherto employed.

It is still another object of our invention to provide a continuous conveyor device which will convey birds for a sufficient distance to permit bleeding, and then through the scalding water without the bird's having to be removed from the carrier.

It is still another object of our invention to provide a carrier including two parallel chains operating in a vertical plane with a swivel shackle-holding device therebetween.

It is still a further object of our invention to provide a device in which the batches of birds carried by a conveyor will be automatically removed at once from the carrier when the conveyor reaches a predetermined point.

Another object of our invention is to provide a new and novel scalding method and apparatus in which the batches of birds are kept in a continuous state of movement while in the scalding vat.

Another object of our invention is to provide a new device for keeping the scalding water in a continuous state of motion while the poultry is in the scalding vat.

Other and further features and objects of the invention will be more apparent to those skilled in the art upon a consideration of the accompanying drawings and following specifications, wherein are shown several embodiments of the invention, with the understanding, however, that such changes may be made therein as fall within the scope of the appended claims without departing from the spirit of the invention.

In said drawings:

Figure 1 is a side view of a device constructed according to one embodiment of our invention, the wall of the scalding vat being cut away to show the position of the conveyor in the scalding vat.

Figure 2 is an end view of the device shown in Figure 1 to more particularly show the manner in which shackles are suspended between the two conveyor chains.

Figure 3 is an enlarged view in perspective of the shackle, such as used in the embodiment shown in Figures 1 and 2.

Figure 4 is a detailed view in cross section of the swivel joint of the shackle shown in Figure 3 to illustrate the manner of mounting thereon.

Figure 5 is a side view of the conveyor similar to that shown in Figure 1, but showing another embodiment of our invention wherein cylindrical baskets are utilized to carry the fowl, a portion of the wall of the tank being cut away to disclose the operating mechanism thereof.

Figure 6 is a view in perspective of a cylindrical basket, such as is shown in Figure 4.

Figure 7 is a view of another embodiment of our invention in which the basket is square and can be used in the device shown in Figure 4 in place of the basket shown.

Figure 8 is a view of the shackle adapted to carry turkeys.

Figure 9:
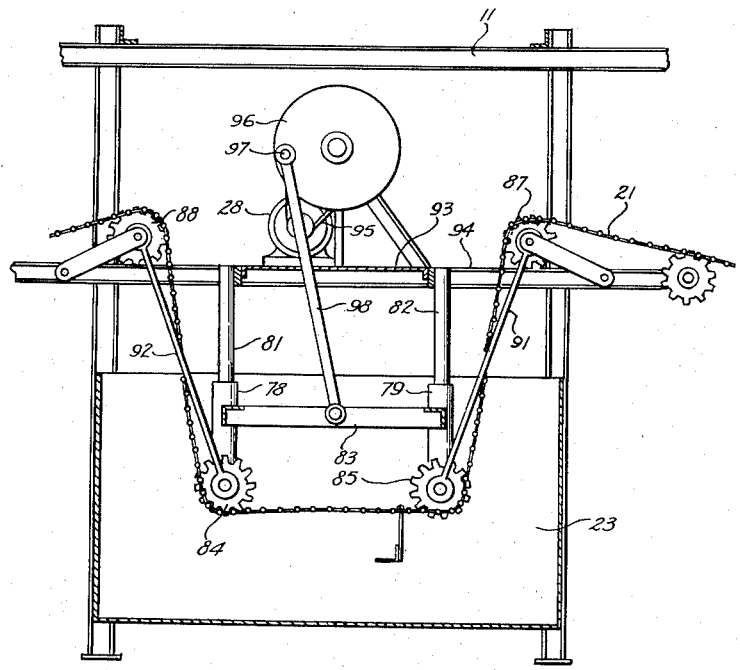
Figure 9 is a side view in cross section of another embodiment of our invention in which the conveyor chain is moved in a reciprocating manner in the scalding vat.

Referring now to the drawings:

All of the various embodiments disclosed herein are adapted to be constructed generally according to the mechanism shown in Figure 1, in that they will include three operating portions which are substantially the same in each instance—that is, the rectangular framework 11 which is adapted to carry a plurality of sprockets, such as 12, 13, 14, 15, 16, 17, 18, 19 and 20 mounted in the framework, these sprockets being adapted to carry a pair of endless chains, such as 21 of Figure 1 and 21 and 22 of Figure 2, these two endless chains being mounted in parallel relationship to each other.

In each instance, the conveyor chain is adapted to be carried downwardly into a scalding vat 23, being threaded around two pulleys, such as 24 and 25. It is between these two continuous conveyor chains that the shackles of various types are mounted.

Figure 10:
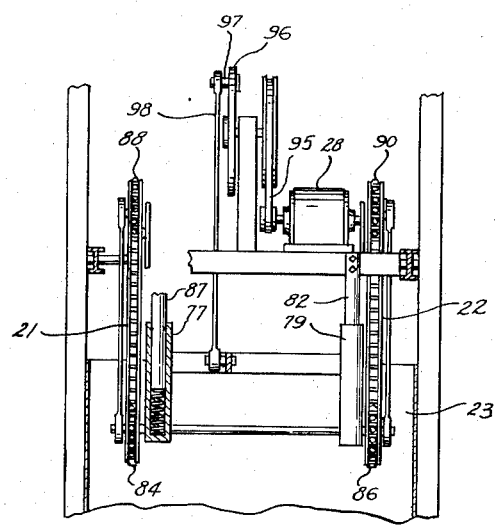
Figure 10 is a front view of the reciprocating mechanism shown in Figure 9.

It will be apparent that this framework is self-supporting and serves to carry all of the mechanism required to operate the system—that is, the various motors such as the drive motor 27, shown in Figure 2, or the drive mechanism for reciprocating the conveyor in the vat, such as shown at 28 of Figures 9 and 10, or the agitator motor 29 of Figures 1 and 2.

A scalding vat may be either mounted integrally with the framework, as shown at 23 of Figure 1, or separately as may be desired. It may be of the type in which the birds are caused to descend into a vat and out again by the chains, or may be a conventional type in which the birds drop into the tank by gravity and are brought out by an inclined conveyor while the chains pass straight through above the vat.

In some instances, the pulleys may be mounted on a through shaft reaching from one pulley to another to transfer driving forces from one chain to the other, or to serve to maintain a guide relationship between one chain and another. In Figure 1 the through shafts are positioned at 30, which is the drive shaft, and at 31, 32 and 33 which are guide shafts. The remaining sprockets are mounted on stub shafts, such as are shown at 34 and 35 of Figure 2. Stub shafts are required in these points so that the shackles 36 may swivel through a complete 360 degree arc as they pass between the opposed sprockets. It will, of course, be apparent that as the shackle passes some points, such as the sprocket 18 and the stub shaft 37, it must be able to swing between the two opposed sprockets.

The structure thus far described is used in the following manner in the several embodiments of the invention disclosed. In operation, the birds are hung on the shackles as they descend downwardly from sprocket 18 to sprocket 19. A shackle in this position is illustrated at 38. Several birds are hung on the one shackle, and at that point the operator carries out the killing operation, either sticking or slitting the throat of the bird which is hanging downwardly from the shackle, the feet being held by the shackle clips, such as are shown in Figure 3 at 39 and 45. Five birds at a time provides a good volume of scalded poultry, but obviously any desired number of birds may be grouped together by employing longer or shorter shackles.

The shackle is then carried inwardly by the conveyor chain towards the scalding vat. It is during this travel that the bird has an opportunity to bleed out fully before actually entering the scalding water. It will be understood that this portion of the framework can be whatever length is required to give adequate bleeding time. The conveyor moves at a relatively slow speed in order that the total travel time from the sprocket 19 to the sprocket 15—that is, over the bleeding area and through the scald—should be at least in excess of one minute and, on some occasions, as much as two minutes.

The conveyor continues to carry the shackle towards the scalding vat, passing over the sprocket 14, and then downwardly into the vat, as indicated by shackle 40. The birds enter the water in the vat and are carried past the sprocket 24, across the bottom of the vat or tank, past the sprocket 25, and then upwardly towards the sprocket 15. This upward travel provides time, while the birds are suspended above the tank, for excess water to drain from the birds back into the scalding tank. The size of the vat and the speed of the conveyor, which is variable, should ordinarily be such as to permit a scalding time of 20 seconds to one minute. Some birds, such as ducks, may require more time and the conveyor speed may be reduced or a longer tank and longer horizontal span of chains employed.

After a group of birds has moved past the sprocket 15, they are moved outwardly towards the end of the frame and towards drive sprocket 17. It is at this point that the birds are removed in any one of the several methods disclosed in the various embodiments. It is also to be understood that a large number of shackles can be carried on the conveyor. It is desirable to have the groups of birds not less than 30 inches apart.

Returning again to that part of the conveyor between sprocket 15 and 17; one method of de-shackling the bird is shown in Figures 1 and 2. This is adapted to the shackle type shown in Figure 3. It will be seen that this shackle includes an angle iron carrier 41 which is suspended from across bar 42, which in turn is mounted between the two chains 21 and 21a. The angle 41 is mounted on the cross bar 42 by means of a pair of swivel joints 43 and 44 which are shown in more detail in Figure 4.

The angle iron shackle is mounted in such a manner that the horizontal flange extends rearwardly in relation to the direction of movement of the conveyor. It has on it a plurality of spring wire clips, such as 45 and 39. It is between these individual clips that the legs of the bird are held. It will be apparent that all that is necessary to remove the feet of the birds from these clips is to exert a force rearwardly toward the open end of the clip, the force being applied to the legs of the birds close to the clips. For this purpose we have provided a cross bar 46, which in turn is mounted on a platform 47a, which is attached to the frame 11. As the shackle moves past this stripper bar, the legs of the birds are forced out of the shackle clips and the birds drop on the platform 47a. In order to reduce the drag on the shackles, the stripper bar may be angled in relation to the shackle so that the birds will be stripped off one by one, rather than all at one time, but of course the time between successive birds is so short that the effect is that of batch stripping. If the bar is straight, stripping of each batch will be simultaneous.

Of course, since the shackle is adapted to swivel through a full 360 degrees on the cross bar 42, it is necessary that it be held in a downward position during the time it passes over the stripper bar. To achieve this, we have provided a pair of inwardly extending flange plates 48 and 49. These are attached to the main frame 11 and extend inwardly and overlap the edge of the shackle angle 41. This of course serves to hold the shackle in a dependent position so that its passage over the stripper bar will not cause it to swivel.

As previously described, the pulley 17 and the pulley 17a opposite are on a single through shaft 30. To carry the swivel shackles over this shaft, we have provided a circular shield 48. This circles the shaft 30 and guides the shackles which are empty at this stage over the shaft. The shackle is then carried rearwardly the length of the frame 11 back to the sprocket 18 where it is again in position to be loaded.

To guide the birds through the tank and hold them in the scalding water and prevent them from floating, I have provided a shield 50 which is extended from a point above downwardly to sprocket 24, then from the sprocket 24 to the sprocket 25, and then upwardly again. This shield is of sufficient width to cover the loaded shackles as they pass through the tank.

Referring again to the shackle, and particularly to Figure 4; the method of swiveling the shackle on the bar 42 is here more fully shown. A pair of flanges 51 and 51a are formed on the shaft or welded thereto. Between these two flanges is a half collar 52 with a downwardly depending shaft 53. This half collar is adapted to receive a second half collar 54 which is bolted in position by two bolts 55 and 56. A bearing portion 57 is provided to secure free movement of the assembled collars between the flanges.

Figure 8 discloses a shackle similar to that shown in Figure 3. However, in this instance only two downwardly depending clips 58 and 59 are attached to the angle 41. These shackles are adapted to carry turkeys. Since a turkey is a much larger bird than the chicken, the shackle width will accommodate only say two turkeys at a time in relation to the five chickens carried on the shackle of the type shown in Figure 3. Of course here again longer shackle bars will carry more turkeys.

To achieve effective scalding of poultry, it is desirable that a vigorous motion be imparted either to the bird or to the water in the tank or both. In the embodiment disclosed in Figures 1 and 2, in addition to the agitation secured by dragging the bird through the scalding water, the water is kept in a state of circulation and agitation by an impeller 60 which is immersed in the tank and driven by the previously described motor 29. This motor is driven from a power source separate from that which drives the conveyor as a whole.

The conveyor drive is mounted on the side of the frame on a platform 61 and includes the gear reduction assembly 27 and an electric motor 27a which is adapted to drive the power shaft 30 through a series of belts and pulleys, such as are shown at 62 and 63. To secure variable speeds, the motor is mounted for horizontal movement, a threaded adjusting screw 64 being mounted on the platform 61 in conjunction with the motor 27a to permit its movement backward and forward. The motor pulley, which is not shown, is any conventional variable speed type in general use. One such pulley has two flanges which may be further separated or moved closer together to slow down or speed up the rate of chain travel.

Referring now to Figures 5, 6 and 7; there is shown still another embodiment of our invention in which baskets are used to carry the birds rather than the shackles previously described.

In this instance, the frame 11 is of the same type as shown in Figures 1 and 2. The sprockets 65 and 66 are mounted in much the same manner as the sprockets 24 and 25 of Figure 1. In this case, however, the conveyor chains 21 and 22 carry either a cylindrical basket, such as shown in Figure 6, or a plural-sided basket such as shown in Figure 7, the cylindrical basket being generally indicated at 67, and the many sided basket at 68.

In both embodiments, the baskets are mounted for full 360 degree rotation on a central shaft 69 which is firmly attached to the chains 21 and 22 by links provided for that purpose. One end of the basket is equipped with a small gear 70. This gear is adapted to engage a gear rack 71 which is mounted in the tank on the same framework as the pulley members 65 and 66, this framework being indicated generally at 72. A rail member 73 is mounted in the tank immediately below the gear rack.

It will be apparent that as the gear 70 engages the gear rack, the guard rail will hold it in position, and as the conveyor moves past the pulleys 65 and 66 with the gear engaged in the rack, the cylindrical drum will revolve, causing the birds to be raised and dropped and the scalding water to be agitated and moved through the basket to thoroughly soak the fowl therein.

The walls of the basket are formed of an open wire mesh, such as is shown at 74. In order to permit the birds to be introduced into the basket, we have provided a hinged cover portion 75. The basket adjacent the door may be weight loaded, as at 68a, to cause the basket to rotate by gravity to a position in which the cover is at the bottom. When the conveyor brings the cylinder into relative position above the platform 47a, the operator unlatches the cover portion, the basket being turned over, either by the weight or manually, until the opening is immediately above the platform, at which time the birds fall onto the platform. They can be taken from this point and moved to the defeathering mechanism.

The basket 68, shown in Figure 7, is operated in the same manner and in the frame 11, utilizes the same mechanism as previously described. However, in this instance, the flat walls permit the bird to be picked up and dropped and agitated within the basket as it turns, more actively than in the case of a cylindrical basket. Again a lid portion 76 is furnished, which operates in the same manner as the lid in the cylindrical basket.

Referring now to Figures 9 and 10; there is shown another embodiment of our invention in which agitation is secured by still another means.

In this instance, again the framework 11 and the tank 23 are utilized. The conveyor chain 21 and 22 is similar to that shown in Figure 1. However, the device is adapted to impart continuous vertical reciprocating motion to the conveyor chain and thus to the birds being carried on it. By moving the birds up and down in the scalding water, the water is kept in a continuous state or agitation and all portions of the bird are brought into actual contact with the water. By immersing the bird downwardly, the feathers tend to flare out and the water reaches the skin of the bird where it loosens the quills.

To permit this vertical reciprocation, we provide a downwardly extending frame, including a plurality of cylindrical rods 77, 78 and 79; a fourth rod is also provided but not shown. Mounted on these rods are a plurality of slidable, cylindrical tubes 80, 81 and 82. These are tied together by a cross member 83. On the bottom of the tubes are sprockets 84, 85 and 86, which carry the chain. Also pivotally mounted on the frame 11 above the tank are two more pairs of sprockets, which are shown at 87, 88 and 89 and 90. These sprockets are mounted for vertical, pivotal movement and are tied to the lower sprockets by the rods 91 and 92. It will be apparent that as the lower sprockets are moved up and down, the same motion will be imparted through the tie rods to the upper sprockets 87 and 88, thus maintaining chain tension throughout the cycle of movement.

To impart vertical, reciprocating movement to the assembly previously described, we mount a motor 28 on platform 93 which is carried on the cross bars 94 of the frame 11. A belt 95 is operatively connected to a crankshaft plate 96, having a stub shaft 97 on the outer periphery. This stub shaft is operatively connected to the crossbar 83 by rod 98.

It will be seen, from the foregoing description, that as the conveyor carries the birds through the scalding vat, the birds are subjected to a constant up and down or dunking movement. The reciprocation of the assembly may be continuous as long as the conveyor itself is in motion.

From the foregoing description, it can be seen that we have provided a device in which a large quantity of birds can be in constant process of killing, bleeding, and scalding. Each shackle, such as the type shown in Figure 3, or the baskets shown in Figures 6 and 7, can carry a plurality of birds through the process at one time, and when removed from the baskets or shackles, they will all be in the same state of readiness for defeathering. In this connection, it is important to note that poultry should be defeathered immediately after scalding.

It will be apparent that a minimum number of people will be necessary to operate a system of a type we have described. An operator will be necessary to load the shackles and kill the fowl. In the devices shown in Figures 1 and 2, an operator will be necessary to remove the birds from the platform, but will not need to remove them from the shackles, thereby freeing one operator for part time work on the defeathering operation. In the devices shown in Figures 6, 7 and 9, the fowl may be readily removed from the baskets by manual or mechanical dumping, which again will not require the entire operator's time.

While the apparatus here shown and described is of the relative dimension best suited for say five chickens or two turkeys on each shackle bar, it is apparent that by merely spacing apart the side members of the apparatus, widening the tank, and lengthening the shackle bars, as many birds as desired may be placed on each shackle bar and thus the capacity of the machine may be tremendously increased with very little increase in transverse dimensions and little or no increase in longitudinal and vertical dimensions.

Although we have described several exemplary embodiments of our invention, it is apparent that modifications thereof may be made by those skilled in the art. Such modifications may be made without departing from the spirit and scope of our invention as set forth in the appended claims.

We claim as our invention:

1. In an apparatus for scalding fowl, a relatively long narrow frame, a plurality of upper and lower spaced pairs of sprockets rotatably mounted on said frame, drive means for at least one pair of said sprockets spaced endless chains supported by said sprockets and extending in an upper reach over said upper spaced pairs of sprockets and in a lower reach over said lower spaced pairs of sprockets, a plurality of spaced rods extending between and secured to said chains, a poultry supporting member pivotally secured to each of said rods, a vat for a scalding liquid positioned beneath said frame, supporting members secured to said frame above said vat and extending downwardly into said vat to a point adjacent the bottom thereof, each of said supporting members having a terminal end adjacent one of opposite ends of said vat, pairs of sprockets mounted on each of said supporting members at the terminal end thereof for guiding said chains beneath the surface of said scalding liquid and the spaced rods secured thereto over and near the bottom of said vat, liquid heating means mounted in said vat at the bottom thereof, a shield secured to the terminal ends of said supporting means above the sprockets located at said terminal ends and extending therebetween over the bottom of said vat, rotatable impeller means supported by said vat adjacent the top thereof and beneath the surface of said scalding liquid, and drive means operatively connected to said impeller for directing scalding liquid through the region defined by the bottom of said vat and said shield and over the heater means at the bottom of said vat whereby fowl secured to said supporting members therefor may be drawn through a confined region in which heated scalding liquid moves.

2. In an apparatus for scalding fowl as set forth in claim 1, a pair of upwardly extending shields, each adjacent and spaced from an end of said vat, the lowermost end of each upwardly extending shield being connected to the adjacent end of said shield positioned adjacent the bottom of said vat, said upwardly extending shields providing spaced passages beneath the surface of the scalding liquid for poultry supporting members entering and leaving said vat.

References Cited in the file of this patent

UNITED STATES PATENTS

| | | |
|---|---|---|
| 1,692,365 | Barrier | Nov. 20, 1928 |
| 1,760,392 | Arminger | May 27, 1930 |
| 1,770,565 | Anderson | July 15, 1930 |
| 2,571,032 | Hanson | Oct. 9, 1951 |
| 2,594,829 | Valenta | Apr. 29, 1952 |
| 2,642,618 | Stubelek | June 23, 1953 |